Sept. 5, 1950     D. HEYER     2,521,457
AUTOMATIC VARIABLE RATIO TRANSMISSION
Filed June 5, 1944     3 Sheets-Sheet 2

DON HEYER, INVENTOR.

BY ATTORNEY.

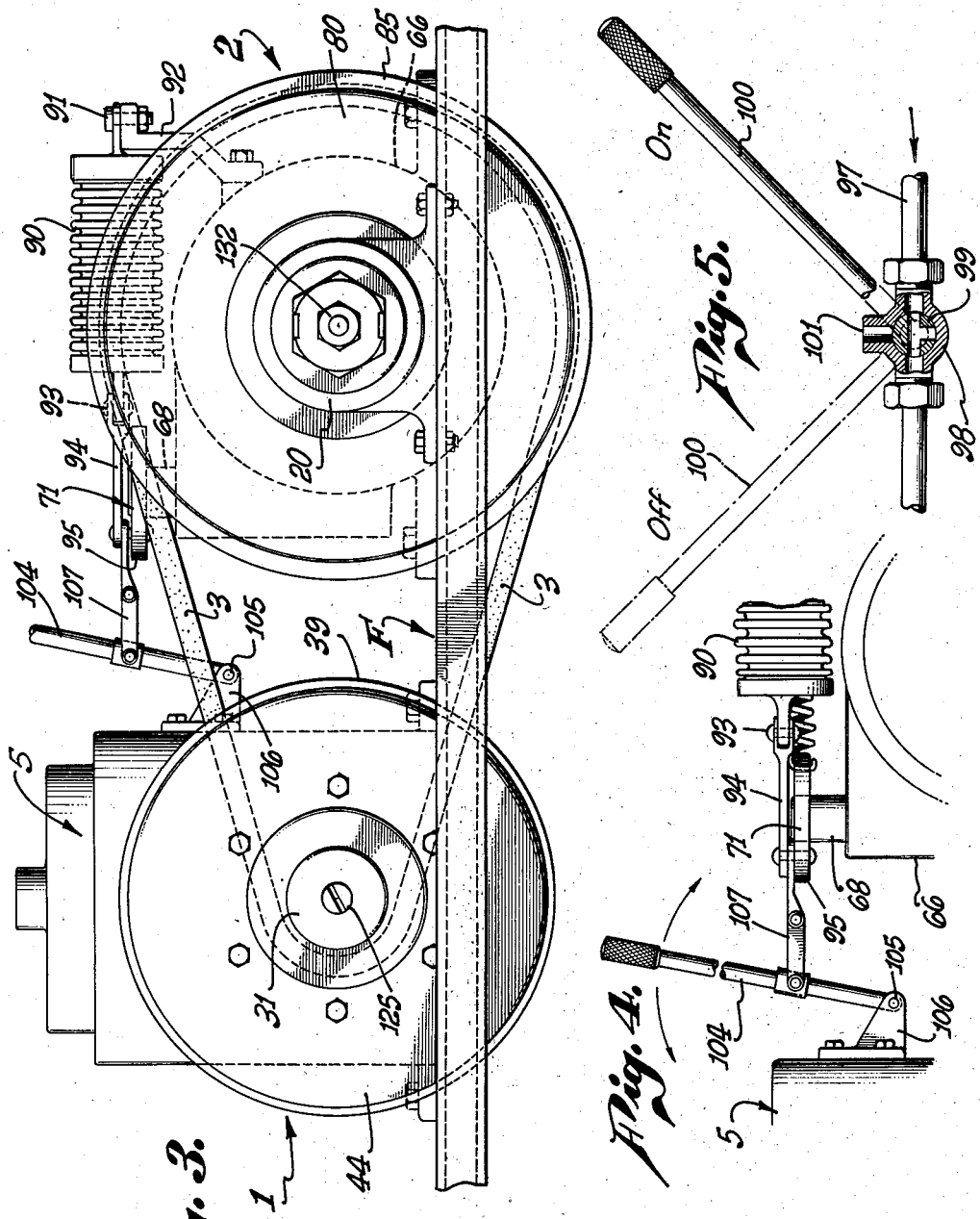

Patented Sept. 5, 1950

2,521,457

UNITED STATES PATENT OFFICE 2,521,457

AUTOMATIC VARIABLE RATIO TRANSMISSION

Don Heyer, Los Angeles, Calif., assignor to International Powermatic Corporation, Los Angeles, Calif.

Application June 5, 1944, Serial No. 538,730

11 Claims. (Cl. 74—230.17)

This invention relates to power transmission mechanism.

It is an object of this invention to provide a transmission wherein power is automatically applied to the load upon the motor or prime mover attaining a predetermined speed.

It is another object of this invention to provide a variable ratio transmission wherein power is automatically applied to the load upon the motor or prime mover attaining a predetermined speed, the transmission ratio thereafter varying automatically in accordance with the load requirements.

It is another object of this invention to provide a variable ratio transmission in which the transmission ratio may be optionally varied automatically in accordance with the speed and torque requirements.

It is another object of this invention to provide a variable ratio transmission having means for automatically varying the transmission ratio in accordance with speed and torque requirements, which may be rendered temporarily inoperative to suit temporary load conditions, such as an overload or requirement for rapid acceleration.

It is another object of this invention to provide a variable ratio transmission for use with an internal combustion engine, and having variable effective diameter pulley structures wherein the effective pulley diameters are controlled by the engine vacuum.

It is another object of this invention to provide a variable ratio transmission including a clutch for connecting the prime mover to the load, wherein substantially increased forces of momentum are available for starting the load.

It is another object of this invention to provide a variable ratio transmission including a clutch for connecting the prime mover to the load, in which the clutch is on the load driving shaft.

It is another object of this invention to provide a variable ratio transmission including an automatic clutch for connecting the prime mover to the load in response to the prime mover attaining a predetermined speed as well as additional clutch means for automatically connecting the load driving shaft to the prime mover whenever the speed of said shaft exceeds that of the prime mover.

It is still another object of this invention to provide a novel form of centrifugally operated variable diameter pulley structure.

It is still another object of this invention to provide an improved vacuum operated mechanism for controlling the effective diameter of a variable diameter pulley structure.

It is still another object of this invention to provide a variable ratio transmission particularly adapted for light, motor driven vehicles.

It is still another object of this invention to provide a novel form of variable diameter pulley structure incorporating clutch means for connecting it to a load driving shaft.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Figure 2 is a horizontal section of the transmission of Figure 1 taken on a plane passing through the axis of the transmission shafts, looking downwardly;

Figure 3 is an elevation as seen from the left of Figure 1;

Figure 4 is a fragmentary cross section taken on line 4—4 of Figure 1; and

Figures 5 and 6 are detail sections taken on correspondingly numbered lines of Figures 1 and 2.

Figure 1:
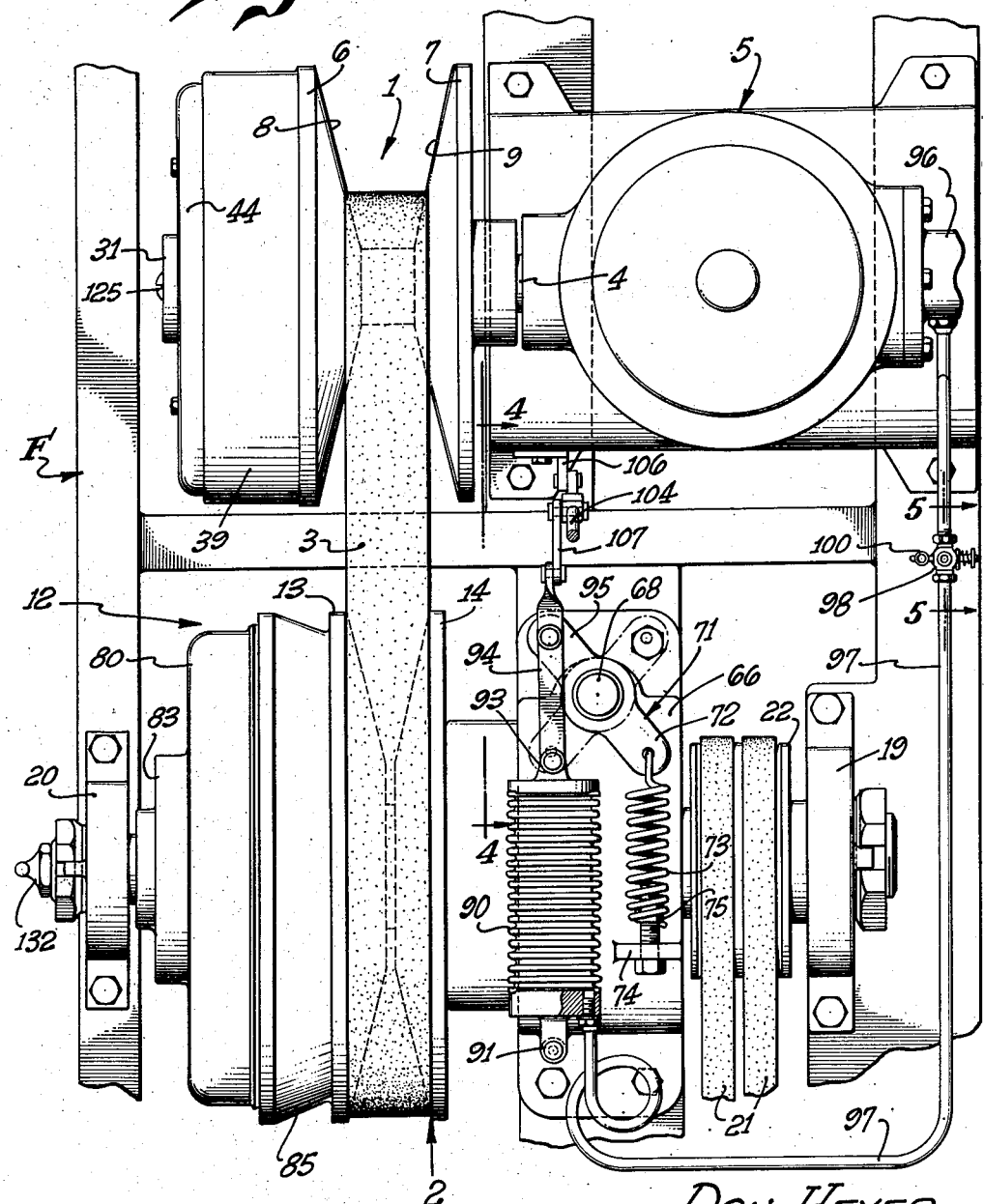
Figure 1 is a top plan view of a transmission incorporating the features of the invention.

Referring to the drawings, the transmission is shown as incorporated in a motor vehicle, for transmitting power between a gasoline engine or the like and the driving wheels of the vehicle. The transmission includes a pair of variable diameter pulley structures 1 and 2 connected by a V-belt 3. The pulley structure 1 is the driving pulley, and is mounted on shaft 4 of the engine 5. Pulley structure 1 includes a pair of pulley sections 6 and 7 having opposed oppositely inclined faces 8 and 9 for engaging the opposite edges of belt 3. The tension in the belt 3 creates a force urging the pulley sections apart to allow the belt to move radially inwardly of the faces 8 and 9 and form a reduced effective pulley diameter. Means are provided for opposing such force and urging the pulley sections together, causing the belt to move radially outwardly on the pulley faces 8 and 9 to a position of increased effective pulley diameter. Such variable diameter pulleys are in general well known. In the present case, the pulley section 7 is fixed against axial movement, while means 10 responsive to the rotation of the engine shaft 4 is provided for urging the pulley section 6 toward the fixed pulley section 7.

The pulley structure 2 forms the load driving pulley and is rotatably mounted on the load driving shaft 11, a driving clutch generally indicated by 12 serving to place the pulley structure 2 and the shaft 11 in driving relation. The pulley structure 2 also includes a pair of pulley sections 13 and 14 with opposed oppositely inclined faces 15 and 16 for engaging the opposite edges of the belt 3, the tension in the belt urging the pulley sections apart to form a decreased effective pulley diameter. The pulley section 14 which faces the adjustable section 6 of the driving pulley 1 is adjustable, the other section being substantially axially fixed. Thus, as the belt 3 moves radially inwardly of the pulley 1 and radially outwardly of the pulley 2 or vice versa, the belt moves laterally and is maintained in alignment for all adjusted positions. Clutch 12 is so arranged that axial force on the pulley section 13 in excess of a certain minimum, as caused by the belt 3, will cause the clutch to couple the pulley 2 to the shaft 11.

Control means to be presently described in detail are provided for restricting the separation of the pulley sections 13 and 14. This determines not only the effective diameter of the load driving pulley 2, but also the effective diameter which driving pulley 1 can assume in response to the speed responsive means 10. Such control means may cause the pulley diameters, and hence the speed ratio, to be determined in accordance with the speed of engine shaft 4, or optionally, the control means may cause the speed ratio to be determined in accordance with the speed and torque requirements of the load, or the speed ratio may be arbitrarily set by the vehicle operator. The load driving shaft 11 is shown as rotatably supported by anti-friction bearings 17 and 18 respectively adjacent its opposite ends and mounted in brackets 19 and 20 mounted on the frame F. Shaft 11 may be connected to the final drive of the vehicle in any preferred manner, for example by a pair of V-belts 21 engaging a double groove pulley 22 keyed on the shaft 11, as by a key 23.

It is common in certain types of light vehicles in which this transmission is particularly useful, to start the motor by pushing the vehicle. Since with the engine 5 not operating, the driving clutch 12 is disengaged, it is necessary to provide a supplemental clutch 24 for connecting the pulley 2 and the shaft 11 for transmitting starting torque from the shaft 11 to the engine shaft 4. This supplemental clutch may conveniently be a conventional over running clutch adapted to engage when the speed of the shaft 11 exceeds that of the pulley 2. When the clutch 12 is engaged the clutch 24 has no effect; when the clutch 12 is disengaged, the clutch 24 will engage whenever the speed of the shaft 11 in a forward direction exceeds the speed of the pulley 2. Thus, the motion of the vehicle is not only effective for starting the engine 5; the engine may be used as a brake when desired.

Figures 2, 6:
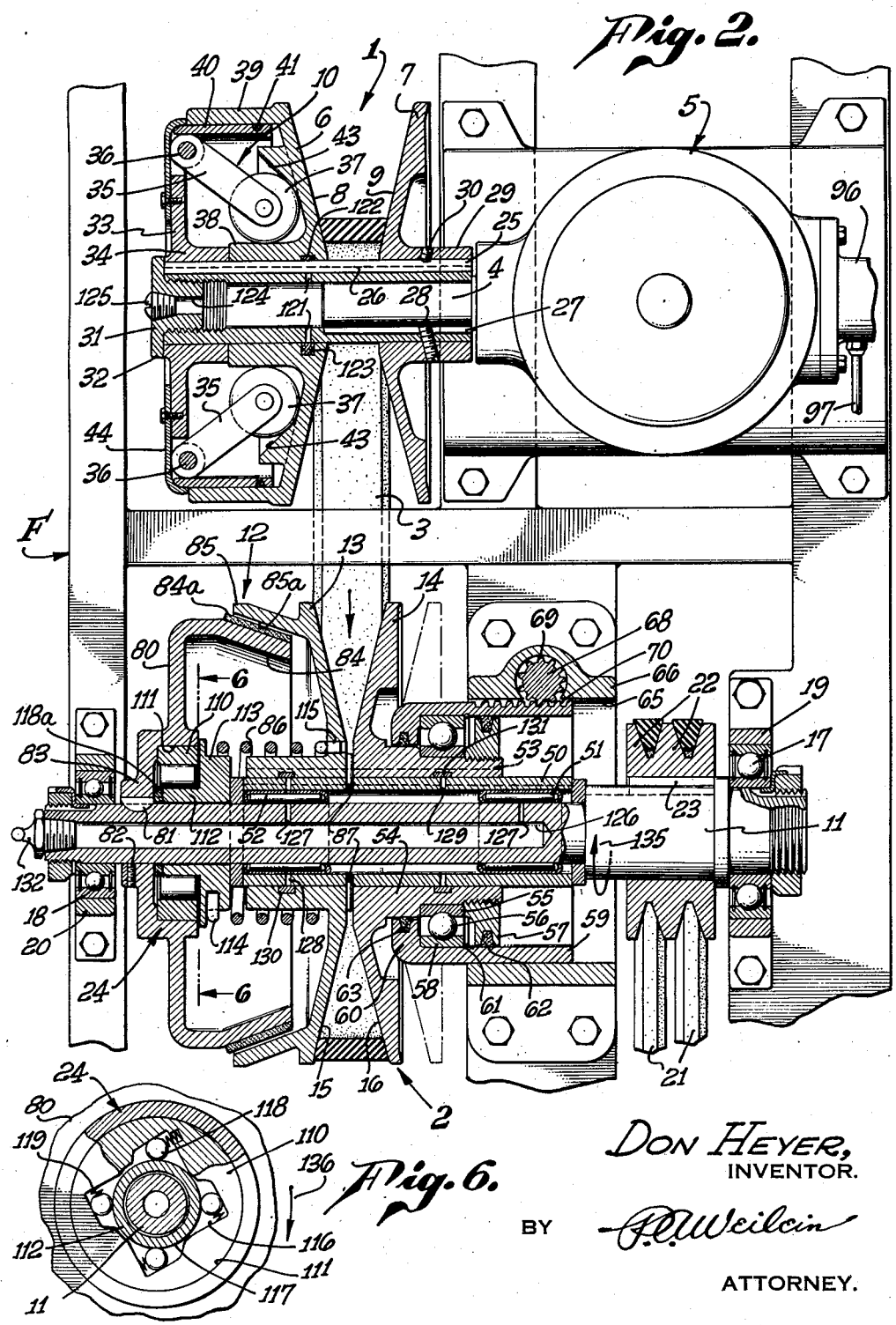

Referring in detail to the transmission, as shown in Figure 2, the driving pulley structure 1 and the adjusting mechanism 10 are mounted as a unit on the engine shaft 4. Thus, a tubular sleeve 25 is provided having a long spline or key 26 on its exterior and is secured on the shaft 4 against angular or axial movement by means of a key 27 and a set screw 28. The pulley section 7 has a hub 29 through which the sleeve 25 and key 26 extend, a set screw 30 serving to axially fix the pulley section on the sleeve. A plug 31, having a flange 32, is threaded into the outer end of the sleeve 25 and serves to retain a spider 33 on the sleeve. The spider 33 has a hub 34 for mounting the spider on the sleeve 25, the key 26 serving to cause the spider 33 to rotate with the sleeve 25. A plurality of arms 35 are swingably mounted on pins 36 carried by the spider 33 near its periphery. Arms 35 are inclined toward the sleeve 25 and cylindrical weights or rollers 37 are rotatably mounted on the inner ends of the arms. Pulley section 6 has a hub 38 slidable on the sleeve 25 and splined thereto by key 26, and a cylindrical flange 39 at its periphery which telescopes over a cooperating flange 40 on the spider 33. A suitable dust and grease seal between these flanges may be provided by a circumferentially extending packing 41. The pulley section 6 has a circular boss 42 providing an annular sloping surface 43 about the axis of the sleeve 25 and engaged by rollers 37. A detachable cover 44 permitting access to the space between the spider 33 and the pulley section 6 may be provided.

With the shaft 4 rotating, centrifugal force urges the weights 37 and arms 35 outwardly from the axis of the shaft about the pins 36. Weights 37, by engagement with the inclined surface 43, create a force urging the pulley section 6 against the belt 3, which is confined against pulley section 7. This urges the belt 3 radially outwardly against tension in the belt, and if sufficient to overcome such tension, the pulley sections 6 and 7 move closer together and the belt 3 moves radially outwardly to a position of greater effective pulley diameter. If the belt tension is or becomes greater than such force urging it outwardly, it will move radially inwardly, forcing the pulley sections 6 and 7 apart and forcing the arms 35 and weights 37 inwardly against the centrifugal force. The maximum separation of the pulley sections 6 and 7, corresponding to a minimum effective pulley diameter, occurs when the weights 37 engage the hub 38. In this position, the weights are confined between the surface of the hub 38 and the surface 43 by the belt tension urging the pulley sections apart, and are thus secured against undesired looseness or rattling. It will be apparent that by appropriately varying the belt tension, the effective diameter which the driving pulley 1 will assume for any given speed of rotation may be controlled, and it is convenient to provide a load driving pulley structure wherein the belt tension similarly varies the effective pulley diameter in an opposite sense as a means of controlling such tension.

The sections 13 and 14 of the load driving pulley structure 2 are mounted on a sleeve 50 which is rotatably mounted on the shaft 11 by suitable anti-friction bearings 51 and 52 for a purpose to be presently described, but which is axially fixed on the shaft 11. Both pulley sections 13 and 14 are splined to rotate with the sleeve 50 as by a long key 53 and are slidable axially thereon. The movement of section 13 which faces the fixed section 7 of the driving pulley 1 is however very slight and will be disregarded for the moment.

Pulley section 14 has a hub 54 with the inner race 55 of an anti-friction thrust bearing 56 clamped thereon by a nut 57 threaded on the end of the hub. The outer race 58 of the bearing 56 is mounted in an adjusting cup 59 as by being secured against a flange 60 at one end of the cup by a snap ring 61. Suitable packing such as felt washers 62 and 63 may be provided for retaining lubricant in the space occupied by the bearing 56. Adjusting cup 59 is slidably mounted in a bore 65 of a bracket 66 suitably supported as by being bolted to the frame F of the vehicle.

As a means of axially adjusting the cup 59 a vertically disposed adjusting shaft 68 is rotatably mounted in the bracket 66 and is provided with gear teeth 69. Gear teeth 69 engage teeth 70 formed in the nature of an axially extending rack on the exterior of cup 59. As shown in Figures 1 and 4, the shaft 68 extends above the bracket 66, a lever 71 being secured on its upper end. One end of a tension spring 73 is attached to one arm 72 of the level 71. The other end of the spring 73 is adjustably secured to a lug 74 on the bracket 66 as by being secured to a nut 75 threaded on a cap screw 76. The spring 73 urges the shaft 68 to rotate in a clockwise direction, urging the pulley section 14 toward the pulley section 13 in opposition to the force exerted by the belt 3 urging the pulley sections apart, in response to the load transmitted by the belt and the force of centrifugal means 10 urging the driving pulley sections 6 and 7 together. By adjusting the tension in the spring 73, the effective pulley diameters which will be formed at any given speed may be determined.

The driving clutch 12 comprises a clutch spider 80 fixed angularly and axially on the shaft 11 by means of a key 81 and set screw 82 in its hub 83. The clutch spider 80 has a conical flange 84 with a friction facing 84—a adapted to engage a cooperating face 85—a on a conical flange 85 formed on the pulley section 13 upon relative axial movement between the pulley section 13 and the clutch member 80 toward each other. A compression spring 86, as will be presently described, urges the pulley section 13 away from the spider 80 to cause the faces 84—a and 85—a to separate. The arrangement is such that with the driving pulley 1 rotating at a low speed, the force exerted by the centrifugal means 10 is not such as to provide enough tension in the belt 3 to overcome the force exerted by the spring 86. Hence the clutch surfaces 84—a and 85—a are maintained out of engagement. However, upon the speed of the engine 5 and the driving pulley 1 being suitably increased, the force exerted by the means 10 increases sufficiently to cause the belt 3 to force the pulley section 13 outwardly against the force of the spring 86, causing the clutch surface 85—a to engage the clutch surface 84—a, placing the pulley structure 2 in driving relation with the shaft 11.

It will be understood that the force exerted by the spring 86 urging the pulley section 13 toward the pulley section 14 is much less than the force exerted by the spring 73 urging the section 14 toward the section 13. Thus, as far as the engagement of the clutch 12 is concerned, the pulley section 14 can be regarded as fixed. On the other hand, when the clutch faces 84—a and 85—a are engaged, the pulley section 13 forms the fixed section of the pulley. It is to be noted that axial movement of the pulley section 13 is so small that any resultant misalignment is negligible; further, the parts can be so arranged that such misalignment occurs only during no load conditions. Thus, when the transmission is operating under load no misalignment will occur.

Since both sections 13 and 14 of the load driving pulley 2 are movable, means are provided for properly aligning these sections when in their positions of maximum effective pulley diameter with sections 6 and 7 of driving pulley 1. Thus, two or more pins 87 are suitably secured in the sleeve 50 for engaging the pulley sections 13 and 14 and limiting their movement toward each other. These pins 87 perform the additional function of preventing the spring 73 forcing the pulley section 14 far enough to the left to move the pulley section 13 to bring the clutch faces 84—a and 85—a into engagement.

Means are provided whereby the ratio can be changed automatically in relation to the torque of the engine. For this purpose a vacuum responsive device 90, which may be an expansible chamber comprising a metallic bellows or Sylphon, has one end 91 fixed as by being attached to an arm 92 on the bracket 66 (Figures 1 and 3), the other end 93 being attached by means of link 94 to arm 95 of the lever 71, which arm 95 extends oppositely of the arm 72. The interior of the bellows 90 is arranged to be in communication with the intake manifold 96 of the engine 5 as by a conduit 97. The force exerted by the bellows 90 acts in opposition to the force exerted by the spring 73, urging the pulley structure 2 toward a decreased effective diameter, and urging an increase in the transmission ratio.

As is well understood, the degree of vacuum in an internal combustion engine depends on the speed and load conditions of the engine. Thus, with high speed and light load, the vacuum in the intake manifold will be high, while with a low speed and heavy load, the vacuum will be low. Accordingly, the force exerted by the bellows 90 is in assisting relation to the force exerted by the centrifugal means 10, which also exerts greater force with increased engine speeds.

A valve 98 is provided in the conduit 97 for optionally rendering the engine vacuum effective or ineffective in bellows 90. As shown in Figure 5, the valve 98 is a conventional three way valve having a ported plug 99 adapted to be rotated through an angle of 90° by a handle 100. In the position shown, the bellows 90 is connected to the intake manifold 96; with handle 100 turned to the broken line position, communication with the intake manifold 96 is interrupted and the interior of bellows 90 is open to the atmosphere through port 101.

Means are provided for manually adjusting the transmission to any desired ratio while in operation and for retaining it in such adjustment against the forces exerted by the automatic means previously described. For this purpose a hand lever 104 (see Figure 4) is pivotally supported at 105 as by a bracket 106 on the engine 5 and connected to the lever arm 95 by a link 107. It will be apparent that movement of the lever 104 about its pivot 105 by the operator, will rotate the shaft 68 and cause a change in the transmission ratio regardless of forces exerted by the spring 73, bellows 90 and centrifugal means 10. Upon release of the lever 104, these forces resume control and the transmission ratio is automatically varied. No detent or other restraint is provided for lever 104, since it is intended that the transmission ratio be varied automatically substantially at all times.

The supplemental or starting clutch 24 will now be described, reference being had to Figures 2 and 6. This may be any preferred type of "freewheeling" or over-running clutch. As shown, it comprises an outer clutch member 110 fixed in a recess 111 in the clutch spider 80 and an inner member 112 freely rotatable on the load driving shaft 11 and having a flange 113 to which one end of the spring 86 is fixed as at 114. The other end of the spring 86 is fixed to the pulley section 13 at 115; thus, the spring 85 performs the dual function of urging the pulley section 13 to the right, as previously described, as well as placing the pulley section 13 and inner clutch member 113 in driving relation.

The outer clutch member 110 has a plurality of angularly spaced pockets 116 cooperating with the cylindrical surface 117 of the inner clutch member 112 to form spaces of decreasing radial depth in which are accommodated wedging elements or rollers 118. A thrust washer 118a is interposed between the member 113 and the hub of clutch spider 80. Upon clockwise movement of the member 110 with respect to the member 113, the elements 118 wedge between the bottoms of the pockets 116 and surface 117, causing the clutch members to be connected for rotation together. To assist in such engagement, a light spring 119 is provided to urge each roller toward wedging position. If the inner clutch member 113 turns clockwise with respect to the outer member 110, the elements 118 are moved out of wedging engagement between the members, and the members are disconnected. Such clutches are well known.

Means are provided for lubricating the adjustable pulley sections for free sliding movement on their respective shafts. Thus, the sleeve 25 is provided with a number of radial ports 121, placing the interior of the sleeve in communication with an annular groove 122 in the hub 38 of the pulley section, a grease retainer 123, as of felt or the like, being placed in the groove. Lubricant is supplied to the interior of the sleeve 25 through an opening 124 in the plug 31, this opening being closed by a removable plug 125.

A similar arrangement is provided for pulley sections 13 and 14. Thus, the shaft 11 is provided with an axial bore 126 and radial ports 127 which pass the lubricant to the bearings 51 and 52 and the space within sleeve 50. From this space lubricant passes through ports 128 and 129 to annular recesses 130 and 131 in the hub of the pulley sections 13 and 14 respectively. These grooves are provided with grease retainers of felt or other suitable material. Lubricant is supplied to bore 126, through a pressure fitting 132 of any preferred type.

The operation of the transmission may now be set forth. With the engine 5 stopped and the vehicle stationary, all parts are in the relative positions of Figure 2, the driving clutch 12 being disengaged. To start the engine, the vehicle is pushed forward causing the load driving shaft 11 and the clutch spider 80 to rotate in the direction indicated by arrows 135 and 136, Figures 2 and 6. This causes the supplemental clutch 24 to engage, so that the pulley structure 2 is similarly rotated and by means of the belt 3 and the pulley 1 the engine shaft 4 is rotated, and the engine started. With the engine idling, the centrifugal means 10 does not act to increase the tension in the belt 3, hence the clutch 12 remains disengaged. Furthermore, rotation of the pulley 2 by the engine causes the inner member 112 of the clutch 24 to turn clockwise with respect to the outer member 110, causing the clutch 24 to disengage.

A slight increase in engine speed causes the centrifugal means 10 to increase slightly the effective diameter of the pulley structure 1 and thus increase the tension in the belt 3, which in turn causes the pulley section 13 to move to the left and engage the clutch spider 80 so that the load driving shaft 11 and the vehicle move at a low speed. With the clutch 12 engaged, the supplemental clutch 24 is without effect. A further increase in engine speed causes further increase in the effective diameter of the driving pulley 1 and a corresponding decrease in the effective diameter of the pulley 2 in accordance with the tension in the spring 73, assuming that the valve 98 is closed.

If the valve 98 is opened, the engine vacuum acts to assist the centrifugal means 10, and since the degree of vacuum depends on the torque required of the engine, the speed ratio of the transmission is determined by the speed and torque output of the engine, or in accordance with the requirments of the load. This valve 98, as previously mentioned has an operating handle 100 for convenient manipulation by the operator or driver. Brief consideration will show that with the vacuum means in operation with a heavily loaded engine, maximum speed ratio of the transmission might never be reached. On the other hand, with a lightly loaded engine, maximum speed ratio might be attained with comparably low engine speed.

It may be desirable to accelerate the engine to a high speed and at the same time maintain the transmission ratio low, for example to obtain a rapid acceleration of the load or a quick "getaway," or for negotiating steep grades. This can be done by means of hand lever 104, which can be shifted to obtain the desired operating characteristics.

The supplemental clutch 24 has the further important advantage of permitting the engine 5 to be used as a brake at any time during forward motion of the vehicle, since the clutch 24 insures a driving connection between the shaft 11 and pulley 2 whenever the speed of the shaft tends to exceed that of the pulley, and independently of the driving clutch 12.

Although the operation of the transmission has been discussed in connection with a motor vehicle, it is to be understood that the transmission is not limited to such use, and has a wide field of utility.

I claim:

1. In a transmission, a driving pulley structure and a load driving pulley structure, said pulley structures being respectively mounted on a driving shaft and a load driving shaft and being operatively connected by an edge active belt, said driving pulley structure including a pair of relatively axially adjustable pulley sections with opposed oppositely inclined belt engaging faces for altering the belt tension in response to relative axial adjustment of the sections, centrifugal means responsive to the speed of said driving shaft for urging said sections toward each other and increasing the belt tension, said load driving pulley including a pair of pulley sections with opposed oppositely inclined belt engaging faces and mounted for free rotation as a unit on said load driving shaft, means restraining one of said pulley sections from axial movement, clutch mechanism for connecting the other pulley section with the shaft and operated to engage or disengage by axial movement of said other section, and means resiliently urging said other pulley section toward the restrained pulley section to maintain the clutch disengaged, increase in belt tension urging said pulley section away from the fixed section to cause the clutch members to engage.

2. In a variable ratio transmission, a driving shaft and a load driving shaft, pulley structures respectively on said shafts and connected by a belt, each of said pulley structures including a pair of relative axially adjustable pulley sections with opposed oppositely inclined belt engaging faces, forming by relative adjustment variable effective pulley diameters, means securing the pulley structure on the driving shaft for rotation therewith, means rotatably mounting the other pulley structure on the load driving shaft, clutch means operable to connect said pulley structure and the load driving shaft for rotation together, comprising an element fixed to move axially as well as to rotate with one section of said other pulley structure and an element axially fixed with respect to said load driving shaft and in driving relation thereto, means responsive to the speed of the driving shaft for increasing the effective diameter of said driving pulley, said increase of pulley diameter operating said clutch elements to engage and connect the other pulley structure to the load driving shaft, and means controlling separation of the pulley sections of the other pulley structure to control the ratio of the transmission.

3. In a variable ratio transmission, a driving shaft operated by an internal combustion engine and a load driving shaft, said engine including a passage in which operation of the engine creates a partial vacuum, pulley structures respectively on said shafts and connected by an active edge belt, each of said pulley structures including a pair of relatively axially adjustable pulley sections with opposed oppositely inclined belt engaging faces, forming by relative adjustment, variable effective pulley diameters, means securing the pulley structure on the driving shaft for rotation therewith, means rotatably mounting the pulley structure on the load driving shaft, clutch means operable to connect said pulley structure and the load driving shaft for rotation together, means responsive to the speed of the driving shaft for increasing the effective diameter of said driving pulley, means whereby said increase of pulley diameter operates said clutch to connect the other pulley structure to the load driving shaft, and means, including an expansible chamber communicating with said passage, for controlling separation of the pulley sections of the other pulley structure in response to said increase of pulley diameter, to control the ratio of the transmission.

4. In a clutch and pulley structure, a rotatable shaft, a sleeve rotatably mounted on said shaft, a pulley structure fixed to rotate with said sleeve and including a pair of relatively axially adjustable pulley sections with opposed oppositely inclined belt engaging faces adapted to engage an edge active belt, the belt tension urging said pulley sections apart, means determining the axial position of one of said pulley sections, an abutment member rotatably mounted with respect to the shaft as well as the sleeve, spring means interposed between said abutment and the other pulley section for urging said section toward said one section, and means forming a one way clutch between the shaft and said abutment, whereby rotation of the shaft in one direction rotates the abutment, said spring transmitting rotation of the abutment to said other pulley section.

5. In a clutch and pulley structure, a shaft, a pulley structure rotatably mounted on the shaft and adapted to be driven by a belt, a driving clutch for connecting said structure in driving relation with the shaft, means responsive to the tension of said belt for operating said clutch, and a supplemental clutch for connecting said shaft in driving relation with said pulley structure upon said shaft rotating in a predetermined direction at a speed greater than the speed of the pulley and independently of said driving clutch.

6. In a variable ratio transmission, a pair of pulley structures connected in driving relation by an edge active belt, at least one of said structures including a pair of pulley sections with opposed oppositely inclined faces for engaging the edges of said belt, one of said pulley sections being axially adjustable with respect to the other section for varying the effective diameter of said structure, the other section having restricted axial movement in response to variations in the belt tension, clutch means for coupling said structure and a shaft in driving relation, operated by movement of said other pulley section, said clutch means including an element connected for axial and rotary movement with said other pulley section and an element axially fixed with respect to said shaft and in driving relation thereto, adjusting means for moving said one pulley section to alter the effective pulley diameter, said adjusting means comprising a member slidably mounted coaxially with said pulley, means for moving said member, and a thrust bearing structure coupling said one pulley section and said member, and means for varying the belt tension independently of said adjusting means to operate the clutch.

7. In a variable ratio transmission for coupling an internal combustion engine to a load, said engine including a passage in which operation of the engine creates a partial vacuum, a pair of pulley structures connected in driving relation by an edge active belt, one of said structures being adapted for operation by said engine, the other structure being adapted to drive said load, at least one of said structures including a pair of pulley sections with opposed oppositely inclined faces for engaging the edges of said belt, one of said pulley sections being axially adjustable with respect to the other section for varying the effective diameter of said structure, the other section having restricted axial movement in response to variations in the belt tension, clutch means for coupling said structure and said load in driving relation, operated by movement of said other pulley section, adjusting means for moving said one pulley section to alter the effective pulley diameter, pressure responsive means including an expansible chamber communicating with said passage, for operating said adjusting means, and means for varying the belt tension independently of said pressure responsive means to operate the clutch.

8. In an adjustable diameter pulley structure: means forming a shaft; a pair of pulley sections coaxially and rotatably mounted with respect to said shaft forming means, said pulley sections having opposed oppositely inclined belt engaging faces for cooperation with an edge active belt, each of said sections being movable axially of the shaft forming means, tension in said belt urging said sections apart; means for adjusting the axial position of one of said pulley sections independently of the other section to vary the effective pulley diameter, said adjusting means comprising a member slidably mounted coaxially with said pulley, means for moving said member, and a thrust bearing structure coupling said one pulley section and said member; means resiliently opposing movement of said other pulley section away from said one section; and clutch means for connecting said pulley structure for rotation with the shaft forming means, comprising an element fixed to move axially as well as to rotate with said other pulley section; and an element in driving relation with the shaft forming means, said elements being operable to engage in response to movement of said other pulley section.

9. In a variable ratio transmission: a driving shaft adapted for operation by an internal combustion engine and a load driving shaft, said engine including a passage in which operation of said engine creates a partial vacuum; pulleys respectively in driving relation on said shafts and connected by an edge active belt, one of said pulley structures including a pair of relatively axially adjustable pulley sections with opposed oppositely inclined belt engaging faces, forming by relative adjustment, different effective pulley diameters, the tension of said belt urging said sections apart; means for varying the tension in said belt; adjusting means including a movable member, for altering the spacing of said pulley sections; pressure responsive means, including an expansible chamber communicating with said passage, for operating said adjusting means; a resilient element connected between said member and a point spaced therefrom, exerting a force urging a change in pulley diameter in one direction; and means for adjusting the space between said member and said point to alter said force and vary the change in pulley diameter responsive to pressure changes in said chamber.

10. In a variable ratio transmission: a driving shaft adapted for operation by an internal combustion engine and a load driving shaft, said engine including a passage in which operation of said engine creates a partial vacuum; pulleys respectively in driving relation on said shafts and connected by an edge active belt, one of said pulley structures including a pair of relatively axially adjustable pulley sections with opposed oppositely inclined belt engaging faces, forming by relative adjustment, different effective pulley diameters, the tension of said belt urging said sections apart, means for varying the tension in said belt, adjusting means for altering the spacing of said pulley sections including lever means; pressure responsive means, including an expansible chamber communicating with said passage, connected with said lever means for operating said adjusting means; means for optionally rendering said pressure responsive means inoperative, and manually operable means connected with said lever means for optionally operating said adjusting means.

11. In a variable diameter pulley device adapted for use with an edge active belt; a rotatable shaft; a sleeve mounted on said shaft for rotation with respect thereto; a pulley structure including a pair of pulley sections with opposed oppositely inclined faces for engaging the edges of the belt and mounted on said sleeve to rotate therewith, one of said sections being axially movable along said sleeve with respect to the other section; adjusting means for positively moving said other section toward and away from said one section to vary the effective pulley diameter, said adjusting means comprising a member slidably mounted coaxially with said pulley, means for moving said member, and a thrust bearing structure coupling said other pulley section and said member; means for coupling said pulley in driving relation with said shaft including an element connected for axial and rotary movement with said one pulley section and an element fixed on said shaft; means resiliently urging said element fixed on the shaft and said one pulley section apart for maintaining said pulley out of coupled relation with the shaft, and adapted to allow movement of said one pulley section to cause engagement of said elements in response to a predetermined tension in said belt; and means limiting movement of said one pulley section away from the fixed element.

DON HEYER.

The following references are of record in the file of this patent:

UNITED STATES PATENTS

| Number | Name | Date |
| --- | --- | --- |
| 1,133,206 | Welty | Mar. 23, 1915 |
| 1,993,547 | Heyer | Mar. 5, 1935 |
| 2,112,157 | Hatcher | Mar. 22, 1938 |
| 2,120,383 | Watson | June 14, 1938 |
| 2,130,995 | Henney | Sept. 20, 1938 |
| 2,150,456 | Perrine | Mar. 14, 1939 |
| 2,173,661 | Perrine | Sept. 19, 1939 |
| 2,215,831 | Heyer | Sept. 24, 1940 |
| 2,342,941 | Johnson | Feb. 29, 1941 |
| 2,260,797 | Burns | Oct. 28, 1941 |
| 2,283,392 | Shadrick | May 19, 1942 |
| 2,294,777 | Heyer | Sept. 1, 1942 |
| 2,313,436 | Hennessy | Mar. 9, 1943 |

FOREIGN PATENTS

| Number | Country | Date |
| --- | --- | --- |
| 343,579 | France | May 31, 1904 |
| 170,470 | Great Britain | Oct. 27, 1921 |
| 340,427 | Italy | May 15, 1936 |
| 371,362 | Italy | May 20, 1939 |